(12) United States Patent
Li et al.

(10) Patent No.: US 11,248,168 B2
(45) Date of Patent: Feb. 15, 2022

(54) INORGANIC-ORGANIC HYBRID CORE-SHELL NANOROD AND LIGHT VALVE HAVING THE NANOROD

(71) Applicant: ZHEJIANG JINGYI NEW MATERIAL TECHNOLOGY CO. LTD, Zhejiang (CN)

(72) Inventors: Yanan Li, Dorval (CA); Dawei Zhang, Dorval (CA); Shiyong Zhao, Dorval (CA); Shuyong Xiao, Dorval (CA); Bin Liang, Zhejiang (CN); Yuzhe Zhang, Zhejiang (CN)

(73) Assignee: ZHEJIANG JINGYI NEW MATERIAL TECHNOLOGY CO. LTD, Zhejiang (CN)

( * ) Notice: Subject to any disclaimer, the term of this patent is extended or adjusted under 35 U.S.C. 154(b) by 0 days.

(21) Appl. No.: 17/268,467

(22) PCT Filed: Nov. 15, 2019

(86) PCT No.: PCT/CN2019/118653
§ 371 (c)(1),
(2) Date: Feb. 14, 2021

(87) PCT Pub. No.: WO2020/103765
PCT Pub. Date: May 28, 2020

(65) Prior Publication Data
US 2021/0198565 A1 Jul. 1, 2021

(30) Foreign Application Priority Data
Nov. 19, 2018 (CN) .......................... 201811379562.6

(51) Int. Cl.
*C09K 9/02* (2006.01)
*G02F 1/17* (2019.01)

(52) U.S. Cl.
CPC ................ *C09K 9/02* (2013.01); *G02F 1/172* (2013.01); *C09K 2211/1018* (2013.01)

(58) Field of Classification Search
CPC ... C09K 9/02; C09K 2211/1018; G02F 1/172; H01B 1/122
See application file for complete search history.

(56) References Cited

U.S. PATENT DOCUMENTS

| 1,963,496 | A | 6/1934 | Land et al. |
| 3,585,381 | A | 6/1971 | Hodson et al. |

(Continued)

FOREIGN PATENT DOCUMENTS

| CN | 1699478 A | 11/2005 |
| CN | 1856734 A | 11/2006 |

(Continued)

OTHER PUBLICATIONS

International Search Report for PCT/CN2019/118653 dated Jan. 23, 2020, ISA/CN.

(Continued)

*Primary Examiner* — Bijan Ahvazi
(74) *Attorney, Agent, or Firm* — Yue (Robert) Xu; Apex Attorneys at Law, LLP

(57) ABSTRACT

Disclosed is an inorganic-organic hybrid core-shell nanorod (200) and a light valve having the nanorod (200). The nanorod (200) comprises a nanorod inner core composed of a metal oxide and a nanorod shell composed of an inorganic-organic complex containing carbon and nitrogen atoms. The nanorod inner core is titanium dioxide $TiO_2$. The core-shell nanorod employs the metal oxide as a core body and the inorganic-organic complex as a shell to account for the many advantages of inorganic-organic hybrid materials, nanomaterials, and the core-shell structure. The synergistic effect of multiple characteristics allows the material to have unique (Continued)

properties. The light valve made of the material has excellent performance, can adjust the light transmittance in a wider range, and has excellent application prospects.

13 Claims, 3 Drawing Sheets

(56) References Cited

U.S. PATENT DOCUMENTS

| | | | | |
|---|---|---|---|---|
| 5,409,734 | A | * | 4/1995 | Lee ............... B32B 17/10036 252/583 |
| 6,334,967 | B1 | * | 1/2002 | Saxe ............... G02B 5/3008 252/585 |
| 6,522,446 | B2 | | 2/2003 | Saxe |
| 6,606,185 | B2 | | 8/2003 | Saxe |
| 9,581,877 | B2 | | 2/2017 | Bass et al. |
| 2005/0140291 | A1 | * | 6/2005 | Hirakata ............ H01L 51/5237 313/512 |
| 2007/0070489 | A1 | | 3/2007 | Verhaegh et al. |
| 2011/0063715 | A1 | * | 3/2011 | Tanaka ............... C08J 3/28 359/296 |
| 2012/0147455 | A1 | * | 6/2012 | Lee ............... G02B 26/026 359/296 |
| 2012/0162292 | A1 | | 6/2012 | Mori et al. |
| 2014/0022779 | A1 | | 1/2014 | Su et al. |
| 2017/0307939 | A1 | | 10/2017 | Banin et al. |
| 2018/0022945 | A1 | * | 1/2018 | Okada ............... C09D 11/033 283/88 |

FOREIGN PATENT DOCUMENTS

| | | | | |
|---|---|---|---|---|
| CN | 102842676 | A | | 12/2012 |
| CN | 103151462 | A | | 6/2013 |
| CN | 103597568 | A | | 2/2014 |
| CN | 105060733 | A | | 11/2015 |
| CN | 105236479 | A | | 1/2016 |
| CN | 106796369 | A | | 5/2017 |
| CN | 106928994 | A | | 7/2017 |
| CN | 107537579 | A | * | 1/2018 ............ B01J 23/50 |
| CN | 107537579 | A | | 1/2018 |
| CN | 109491174 | A | | 3/2019 |

OTHER PUBLICATIONS

Photodeposition of copper sulphide nanocrystals on titanium(IV) oxide nanorods and their application in smart windows, Sho-ichi Eda et. al,.(RSC Advances, 10414-104193, 2013).

Electro-optics of electrospun TiO2 anatase submicron wire based dipole particle suspension device, Andris Sutka et. al,.(Optical Materials, 740-744, 37, 2014).

The 1st Office Action dated Apr. 29, 2020 for the Chinese Patent Application No. CN201811379562.6.

The 1st Office Action dated Aug. 31, 2021 for the Japanese Patent Application No. JP2021-509173.

Yiqun Yang et al., Plasmonic Enhancement of Biosolar Cells Employing Light Harvesting Complex II Incorporated with Core-Shell Metal@TiO2 Nanoparticles, Adv. Mater. Interfaces, Dec. 31, 2016.

A. S'aenz-Trevizo et al.,Single and multi-layered core-shell structures based on ZnO nanorods obtained by aerosol assisted chemical vapor deposition, Materials Characterization, Apr. 30, 2015.

Yang Tian et al.,Monodisperse rutile microspheres with ultrasmall nanorods on surfaces: Synthesis, characterization, luminescence, and photocatalysis, Journal of Colloid and Interface Science 385 (2012) 1-7, Jul. 20, 2012.

* cited by examiner

INORGANIC-ORGANIC HYBRID CORE-SHELL NANOROD AND LIGHT VALVE HAVING THE NANOROD

CROSS REFERENCE TO RELATED APPLICATIONS

This application is the national phase of International Application No. PCT/CN2019/118653, titled "INORGANIC-ORGANIC HYBRID CORE-SHELL NANOROD AND LIGHT VALVE HAVING THE NANOROD", filed on Nov. 15, 2019, which claims the priority to Chinese Patent Application No. 201811379562.6 filed with the China National Intellectual Property Administration on Nov. 19, 2018 and titled "INORGANIC-ORGANIC HYBRID CORE-SHELL NANOROD AND LIGHT VALVE HAVING THE NANOROD", the content of which is incorporated herein by reference in its entirety.

FIELD

The present invention relates to a core-shell nanorod and a light valve having the same, and in particular to an inorganic-organic hybrid core-shell nanorod and a light valve having the nanorod.

BACKGROUND

A light valve is a device that can adjust the transmittance of light passing through itself, and for example, a curtain can also be regarded as a light valve. In the present invention, however, a light valve refers to a device capable of controlling light transmittance by adjusting the voltage applied thereon, and such device is also known as an electrochromic device. The electrochromic device can be divided into polymer dispersed liquid crystal (PDLC) (U.S. Pat. No. 3,585,381), electrochemical device (EC) (U.S. Pat. No. 9,581,877) and suspended particle device (SPD) (U.S. Pat. No. 6,606,185) depending on its operating principle. Specifically, a light valve (hereinafter referred to as LV) refers to a device capable of controlling the transmittance of light passing through the medium by adjusting the alternating current (AC) voltage applied on the medium. Such light valve has the advantages of adjustable light transmittance and energy saving, and such device can be used as a smart window, rearview mirror, display, etc.

More than 80 years ago, people invented a light valve device comprising nanoparticles. For example, U.S. Pat. No. 1,963,496 proposes a light valve comprising metal particles for the first time. U.S. Pat. No. 6,522,446 discloses a light valve with a light modulation unit, which comprises anisometric metal nanorod with an average length of about 1 μm to 50 nm. U.S. Pat. No. 6,606,185 discloses thin films of suspended particle device (SPD), which comprise a light modulation unit of a suspension, wherein the light modulation unit is composed of a suspension comprising rod-shaped particles of mixed metal oxide (for example, manganese bismuth oxide), and the average length of the particles is 1 μm to 50 nm.

Andris Sutka et al. (Optical Materials, 740-744, 37, 2014) discovered for the first time that the light transmittance of $TiO_2$ nanowires suspended in polydimethylsiloxane (PDMS) varied by 23% after being powered on under the action of electric field. However, such variation range is relatively low for practical application and cannot meet the actual needs.

Sho-ichi Eda et al. (RSC Advances, 10414-10419, 3, 2013) reported a rutile $TiO_2$ nanorods material deposited with copper sulfide nanocrystals synthesized by a low-temperature liquid-phase route ($CuS$—$TiO_2$ NRs). The smart glass produced with a dipolar particle suspension (DPS) of the nanorod material has good performance of adjusting the light transmittance. When an alternating current of 30 V (frequency=60 Hz) is applied, the parallel light transmittance at 500 nm of the light valve device varies from 10% (power off) to 42% (power on), however, such a small variation range of the light transmittance still limits its commercial application.

It can be seen that in the prior art, a small range of color change remains a problem for light valve comprising metal oxide, and such a range is far from meeting the needs in practical application. Therefore, it is necessary to develop a better material for light valve, which can control the light transmittance in a wider range by adjusting the voltage.

SUMMARY

In view of the above problems, the inventor surprisingly found through research that a core-shell nanorod employing metal oxide $TiO_2$ as a core body and an inorganic-organic complex as a shell body has excellent and unique properties, and can adjust light transmittance in a wide range.

Therefore, on the basis of the above findings, the present invention provides an inorganic-organic hybrid core-shell nanorod and a light valve having the nanorod. The nanorod is a core-shell nanorod with metal oxide $TiO_2$ as a core body and an inorganic-organic complex as a shell body. Such nanorod has unique properties and many advantages. The light valve made of this nanorod material has excellent performance, can adjust light transmittance in a wider range, and has excellent application prospects.

Based on the above findings, in a first aspect, the present invention provides an inorganic-organic hybrid core-shell nanorod, comprising a nanorod inner core composed of a metal oxide and a nanorod outer shell composed of an inorganic-organic complex containing carbon and nitrogen atoms. The nanorod inner core is titanium dioxide $TiO_2$.

Further, the nanorod outer shell is an inorganic-organic complex, which comprises four components B, C, D and E, wherein the component B is iodine, the component C is an alkali metal halide or an alkaline earth metal halide, the component D is a nitrogen-containing heterocyclic carboxylic acid or a nitrogen-containing heterocyclic carboxylic acid ester, and the component E is a modified cellulose, and the mass ratio of the components B:C:D:E is (0.2-5):1:(0.4-3):(0.5-5).

Further, the nanorod has a particle length of 50-800 nm, and an aspect ratio of the particle length to the particle width of 2-30.

Further, the nanorod has a particle length of preferably 200-500 nm, and an aspect ratio of the particle length to the particle width of preferably 5-15.

Further, the titanium dioxide $TiO_2$ is one or more of rutile $TiO_2$, brookite $TiO_2$, titanium dioxide (B) and anatase $TiO_2$.

Further, the titanium dioxide $TiO_2$ has a particle size of 5-500 nm.

Further, the titanium dioxide $TiO_2$ has a particle size of preferably 10-100 nm.

Further, the purity of the iodine is not less than 98%.

Further, the alkali metal halide or the alkaline earth metal halide is one or more of calcium iodide, barium iodide, calcium bromide and barium bromide.

Further, the purity of the alkali metal halide or the alkaline earth metal halide is not less than 99%.

Further, the nitrogen-containing heterocyclic carboxylic acid or the nitrogen-containing heterocyclic carboxylic acid ester is one or more of the following compounds:

[pyrrole-X structure]

X = (COOH)n or (COOR)n with n being 1 to 4;

[imidazole-X structure]

X = (COOH)n or (COOR)n with n being 1 to 3;

[triazole-X structure]

X = (COOH) or (COOR)

with n being 1 to 2;

[pyridine-X structure]

X = (COOH)n or (COOR)n with n being 1 to 5;

[pyrazine-X structure]

X = (COOH)n or (COOR)n with n being 1 to 4;

[3-iodopyrazine-2-carboxylic acid structure] ; [methyl 3-iodopyrazine-2-carboxylate structure];

-continued

[pyrimidine-X structure]

X = (COOH)n or (COOR)n with n being 1 to 4;

[quinoline-X structure]

X = (COOH)n or (COOR)n with n being 1 to 7;

[isoquinoline-X structure]

X = (COOH)n or (COOR)n with n being 1 to 7;

[naphthyridine-X structure]

X = (COOH)n or (COOR)n with n being 1 to 6;

[phenanthroline dicarboxylic acid structure]; [bipyridine dicarboxylic acid structure];

[bipyridine-4,4'-dicarboxylic acid structure];

-continued

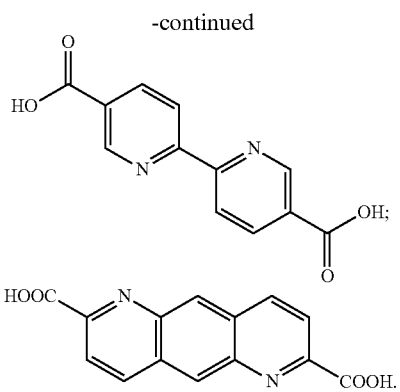

Further, the modified cellulose is at least one of nitrocellulose, ethyl cellulose, cellulose acetate and cellulose butyrate.

In another aspect, the present invention provides a method for preparing the inorganic-organic hybrid core-shell nanorod of the present invention, wherein the method uses isoamyl acetate as a solvent, and uses a lower alcohol with less than 8 carbon atoms and distilled water as a charge balancing agent, wherein the mass ratio of the components titanium dioxide $TiO_2$:component B:component C:component D:component E:lower alcohol:water:isoamyl acetate is (0.01-1.5):(0.2-5):1:(0.4-3):(0.5-5):(0.1-8):(0.01-5):(5-100), and the method comprises the following steps:

a. adding a modified cellulose as the component E, iodine as the component B, isoamyl acetate, an alkali metal halide or an alkaline earth metal halide as the component C, and titanium dioxide $TiO_2$ in the above mass ratio into a reaction vessel, heating, adding a lower alcohol, distilled water, and a nitrogen-containing heterocyclic carboxylic acid or a nitrogen-containing heterocyclic carboxylic acid ester as the component D, and stirring;

b. centrifuging the reaction solution obtained in step a to remove the large-particle products, and then centrifuging the supernatant to obtain an inorganic-organic hybrid core-shell $TiO_2$ nanorod.

In a preferred embodiment, the method is as follows:

Isoamyl acetate is used as a solvent, and a lower alcohol with less than 8 carbon atoms and distilled water are used as a charge balancing agent, wherein the mass ratio of the components titanium dioxide $TiO_2$:component B:component C:component D:component E:lower alcohol:water:isoamyl acetate is (0.01-1.5):(0.2-5):1:(0.4-3):(0.5-5):(0.1-8):(0.01-5):(5-100), and the method comprises the following steps:

a. adding a modified cellulose as the component E, iodine as the component B, isoamyl acetate, an alkali metal halide or an alkaline earth metal halide as the component C, and titanium dioxide $TiO_2$ in the corresponding mass ratio into a reaction vessel, then heating to 5-150° C., adding the lower alcohol, distilled water, and a nitrogen-containing heterocyclic carboxylic acid or a nitrogen-containing heterocyclic carboxylic acid ester as the component D after the iodine is dissolved, continuing the heating to keep the temperature, and stirring to react for 0.1-20 h, and then cooling naturally;

b. centrifuging the reaction solution at 1350 G for 0.5 h to remove the large-particle products, and then centrifuging the supernatant at 18000 G for 5 h, and discarding the supernatant to give light controlled particles to obtain the inorganic-organic hybrid core-shell $TiO_2$ nanorod.

In still another aspect of the present invention, a light valve capable of controlling light transmittance is also provided, comprising two transparent electrodes and a liquid suspension medium sandwiched between the electrodes, wherein the core-shell nanorod is uniformly dispersed in the liquid suspension medium, the nanorod having a balanced buoyancy and gravity in the liquid suspension medium to allow the nanorod to suspend stably in the liquid suspension medium and to move freely, and the two transparent electrodes are connected with an alternating current with an adjustable voltage.

Further, the liquid suspension medium is a non-conductive liquid, which is at least one of mineral insulating oil, synthetic insulating oil and vegetable oil.

Further, the mineral insulating oil is transformer oil.

Further, the synthetic insulating oil is at least one of silicone oil, a fluorocarbon organic compound, dioctyl phthalate, dibutyl phthalate, diisooctyl phthalate, triisodecyl trimellitate (TDTM), dodecylbenzene and polybutylene oil.

Further, the vegetable oil is at least one of castor oil, soybean oil and rapeseed oil.

Further, the transparent electrode is ITO conductive glass or ITO/PET conductive film or nano-Ag wire/PET conductive film or nano-Cu wire/PET conductive film.

Further, the two transparent electrodes sandwiching the liquid suspension medium are sealed around with an insulating material which is an epoxy resin.

Further, the alternating current is an alternating current of 5-500 V.

Here, the value of the alternating current refers to the effective value.

In yet another aspect, the present invention also provides use of the inorganic-organic hybrid core-shell nanorod in the manufacturing of a light valve capable of controlling light transmittance.

In another aspect, the present invention provides a method for controlling light transmittance, comprising uniformly dispersing the inorganic-organic hybrid core-shell nanorod of the present invention in a liquid suspension medium, wherein the liquid suspension medium is sandwiched between two transparent electrodes. When the electrodes and the liquid suspension medium dispersed with the nanorod are placed in an optical path, the variation of light transmittance can be adjusted by turning on or turning off the electric field.

The inorganic-organic hybrid core-shell nanorod of the present invention has a core body of metal oxide titanium dioxide $TiO_2$ and a shell body of an inorganic-organic complex. Without being limited by theory, the inventors found that the metal oxide can act as a seed to induce the inorganic-organic complex shell to grow around the metal oxide to form a core-shell structure; metal atoms in the alkali metal halide or the alkaline earth metal halide (component C) can form a chemical bond with nitrogen atoms in the nitrogen-containing heterocyclic carboxylic acid or the nitrogen-containing heterocyclic carboxylic acid ester (component D); iodine (component B) can also form a polyiodide compound with metal atoms in the alkali metal halide or the alkaline earth metal halide (component C); and the selected modified cellulose can inhibit the agglomeration of the formed core-shell nanorod, control the production speed of different crystal planes, and facilitate the rapid growth of certain crystal plane in preference to other crystal planes, therefore producing rod-shaped morphology.

Surprisingly, the water and the lower alcohol added in the method can balance the inorganic-organic complex shell in a way of hydrogen bond or coordination bond, playing a role of, such as, balancing charges, thereby making the structure of the inorganic-organic complex more stable.

In the light valve made of the core-shell nanorod of the present invention, when no electric field is applied (OFF state), the core-shell nanorod in the liquid suspension is randomly dispersed due to Brownian motion, at this time, the light beam entering the light valve is absorbed and/or scattered, so that the light valve has poor light transmittance and is relatively dark. When an electric field is applied (ON state), the core-shell nanorod is polarized by the electric field and therefore oriented in a direction parallel to each other in the electric field, so that most of the light can pass through the light valve, so that the light valve has effectively enhanced light transmittance and is relatively transparent.

It is shown by experiments that the full light transmittance of the light valve of the present invention reaches 68.1%, which is significantly more superior than that of light valve in the prior art. The light valve of the present invention overcomes the disadvantage of a small adjustable range of light transmittance of light valve in the past, achieves better technical effects, can adjust light transmittance in a wider range, and has excellent application prospects.

BRIEF DESCRIPTION OF DRAWINGS

FIG. 2 is a schematic view of the structure of the light valve of the present invention when powered on;

DETAILED DESCRIPTION

Figure 1:
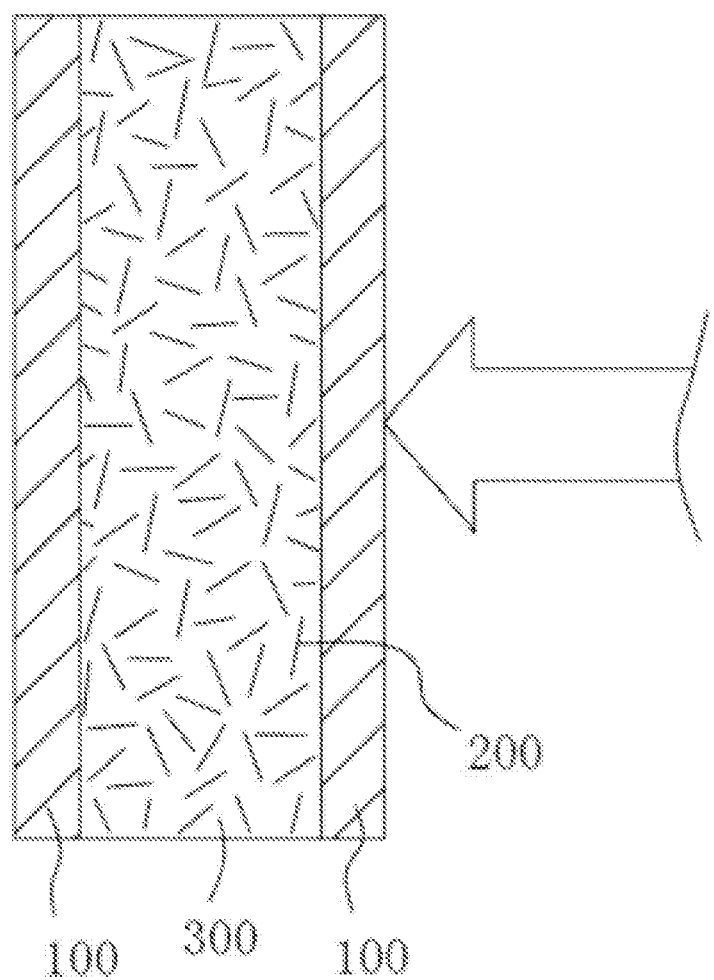
FIG. 1 is a schematic view of the structure of the light valve of the present invention.

The present invention provides an inorganic-organic hybrid core-shell nanorod, comprising a nanorod inner core composed of a metal oxide and a nanorod outer shell composed of an inorganic-organic complex containing carbon and nitrogen atoms.

It is well known in the art that core-shell nanoparticles are a biphasic material, which has an inner core structure and an outer shell made of different components. The material can exhibit unique properties.

The nanorod inner core is titanium dioxide ($TiO_2$), which is one or more of rutile $TiO_2$, brookite $TiO_2$, titanium dioxide (B) and anatase $TiO_2$. Such titanium dioxide $TiO_2$ can be selected from commercial products, for example, Aeroxide® P25 purchased from Sigma Aldrich Company (produced by Evonik Degussa GmbH, Germany) with an average particle size of 25 nm. In particular, in outdoor situations, in order to maintain color stability of the light valve, titanium dioxide $TiO_2$ is more preferably rutile $TiO_2$.

The titanium dioxide $TiO_2$ has a particle size of 5-500 nm, more preferably 10-100 nm.

The nanorod outer shell is composed of an inorganic-organic complex containing carbon and nitrogen atoms, which comprises four components B, C, D and E, wherein the component B is iodine, the component C is an alkali metal halide or an alkaline earth metal halide, the component D is a nitrogen-containing heterocyclic carboxylic acid or a nitrogen-containing heterocyclic carboxylic acid ester, and the component E is a modified cellulose, and the mass ratio of the components B:C:D:E is (0.2-5):1:(0.4-3):(0.5-5).

The purity of the iodine is not less than 98%.

The alkali metal halide or the alkaline earth metal halide can be selected from directly purchased commercial compounds, such as calcium iodide, barium iodide, calcium bromide and barium bromide, etc., and preferably, the purity of the selected alkali metal halide or alkaline earth metal halide is not less than 99%.

The nitrogen-containing heterocyclic carboxylic acid or the nitrogen-containing heterocyclic carboxylic acid ester is as the compounds listed in the table below, but is not limited to the compounds in Table 1.

TABLE 1

| No. | Structural formula | n value |
|---|---|---|
| 1 | 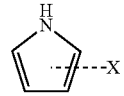<br>X = (COOH)n<br>or (COOR)n | 1-4 |
| 2 | 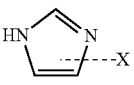<br>X = (COOH)n<br>or (COOR)n | 1-3 |
| 3 | 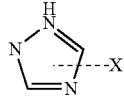<br>X = (COOH)<br>or (COOR) | 1-2 |
| 4 | 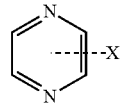<br>X = (COOH)n<br>or (COOR)n | 1-5 |
| 5 | 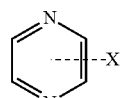<br>X = (COOH)n<br>or (COOR)n | 1-4 |
| 6 | 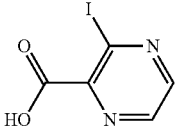 | / |
| 7 | 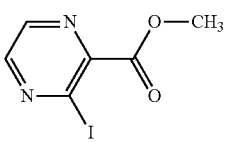 | / |
| 8 | 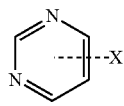<br>X = (COOH)n<br>or (COOR)n | 1-4 |

TABLE 1-continued

| No. | Structural formula | n value |
|---|---|---|
| 9 | 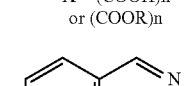<br>X = (COOH)n<br>or (COOR)n | 1-7 |
| 10 | 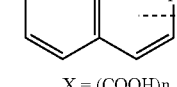<br>X = (COOH)n<br>or (COOR)n | 1-7 |
| 11 | 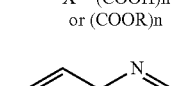<br>X = (COOH)n<br>or (COOR)n | 1-6 |
| 12 | 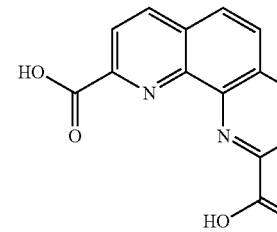 | / |
| 13 | 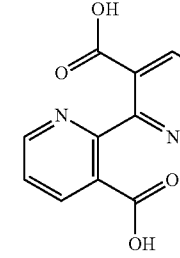 | / |
| 14 | 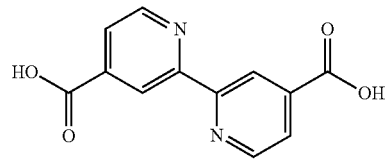 [SMILES: O=C(O)c1ccnc(-c2cc(C(=O)O)ccn2)c1] | / |
| 15 | 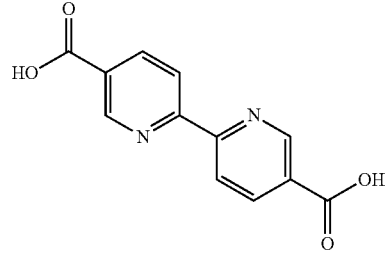 [SMILES: O=C(O)c1ccc(-c2ccc(C(=O)O)cn2)nc1] | / |
| 16 | 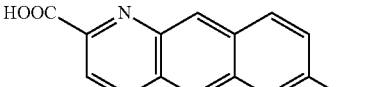 | / |

The modified cellulose is at least one of nitrocellulose, ethyl cellulose, cellulose acetate and cellulose butyrate.

The nanorod has a particle length of 50-800 nm, more preferably 200-500 nm, and a ratio of the particle length to the particle width of 2-30, more preferably 5-15.

The inorganic-organic hybrid core-shell nanorod designed by the present invention has a core body of metal oxide titanium dioxide $TiO_2$ and a shell body of an inorganic-organic complex. Without being limited by theory, the inventors found that the metal oxide can act as a seed to induce the inorganic-organic complex shell to grow around the metal oxide to form a core-shell structure; metal atoms in the alkali metal halide or the alkaline earth metal halide (component C) can form a chemical bond with nitrogen atoms in the nitrogen-containing heterocyclic carboxylic acid or the nitrogen-containing heterocyclic carboxylic acid ester (component D); iodine (component B) can also form a polyiodide compound with metal atoms in the alkali metal halide or the alkaline earth metal halide (component C); and the selected modified cellulose can inhibit the agglomeration of the formed core-shell nanorod, control the production speed of different crystal planes, and facilitate the rapid growth of certain crystal plane in preference to other crystal planes, therefore producing rod-shaped morphology.

Here, in order to prepare the inorganic-organic hybrid core-shell nanorod of the present invention, the present invention provides a method for preparing the inorganic-organic hybrid core-shell nanorod, wherein the method uses isoamyl acetate as a solvent, and uses a lower alcohol with less than 8 carbon atoms and distilled water as a charge balancing agent, wherein the mass ratio of component titanium dioxide $TiO_2$:component B:component C:component D:component E:lower alcohol:water:isoamyl acetate is (0.01-1.5):(0.2-5):1:(0.4-3):(0.5-5):(0.1-8):(0.01-5):(5-100), and the method comprises the following specific steps:

a. adding a modified cellulose as the component E, iodine as the component B, isoamyl acetate, an alkali metal halide or an alkaline earth metal halide as the component C, and titanium dioxide $TiO_2$ in the corresponding mass ratio of components into a reaction vessel, then heating to 5-150° C., adding the lower alcohol, distilled water, and a nitrogen-containing heterocyclic carboxylic acid or a nitrogen-containing heterocyclic carboxylic acid ester as the component D after the iodine is dissolved, continuing the heating to keep the temperature, and stirring to react for 0.1-20 h, and then cooling naturally;

b. centrifuging the reaction solution at 1350 G for 0.5 h to remove the large-particle products, and then centrifuging the supernatant at 18000 G for 5 h, and discarding the supernatant to give light controlled particles to obtain the inorganic-organic hybrid core-shell $TiO_2$ nanorod.

It was surprisingly found that the water and the lower alcohol added in the above method can balance the inorganic-organic complex shell in a way of hydrogen bond or coordination bond, playing a role of, such as, balancing charges, thereby making the structure of the inorganic-organic complex more stable.

As shown in FIG. 1, a light valve capable of controlling light transmittance comprises two transparent electrodes 100 and a liquid suspension medium 300 sandwiched between the electrodes. The above-mentioned core-shell nanorod 200 is uniformly dispersed in the liquid suspension medium 300, the nanorod 200 having a balanced buoyancy and gravity in the liquid suspension medium 300 to allow the nanorod to suspend stably in the liquid suspension medium 300 and to move freely. The two transparent electrodes 300 are connected with an alternating current with an adjustable voltage.

The liquid suspension medium 300 is a non-conductive liquid, which is at least one of mineral insulating oil, synthetic insulating oil and vegetable oil. The mineral insulating oil is transformer oil and the like. The synthetic insulating oil is at least one of silicone oil, a fluorocarbon organic compound, plasticizer (dioctyl phthalate, dibutyl phthalate, diisooctyl phthalate and triisodecyl trimellitate (TDTM), etc.), dodecylbenzene, polybutene oil, etc. The vegetable oil is at least one of castor oil, soybean oil, rapeseed oil, etc. Here, the liquid suspension medium 300 used in the light valve of the present invention is not limited to the above, and can be any liquid suspension for light valve known in the art, and can be formulated according to the technology well known by those skilled in the art.

The transparent electrode 100 is ITO conductive glass or ITO/PET conductive film or nano-Ag wire/PET conductive film or nano-Cu wire/PET conductive film.

The two transparent electrodes 100 are sealed around with an insulating material, which is an epoxy resin.

The light valve adjusts light transmittance through the drive of an alternating current, preferably an alternating current of 5-500 V.

Here, the value of the alternating current refers to the effective value.

Figure 2:
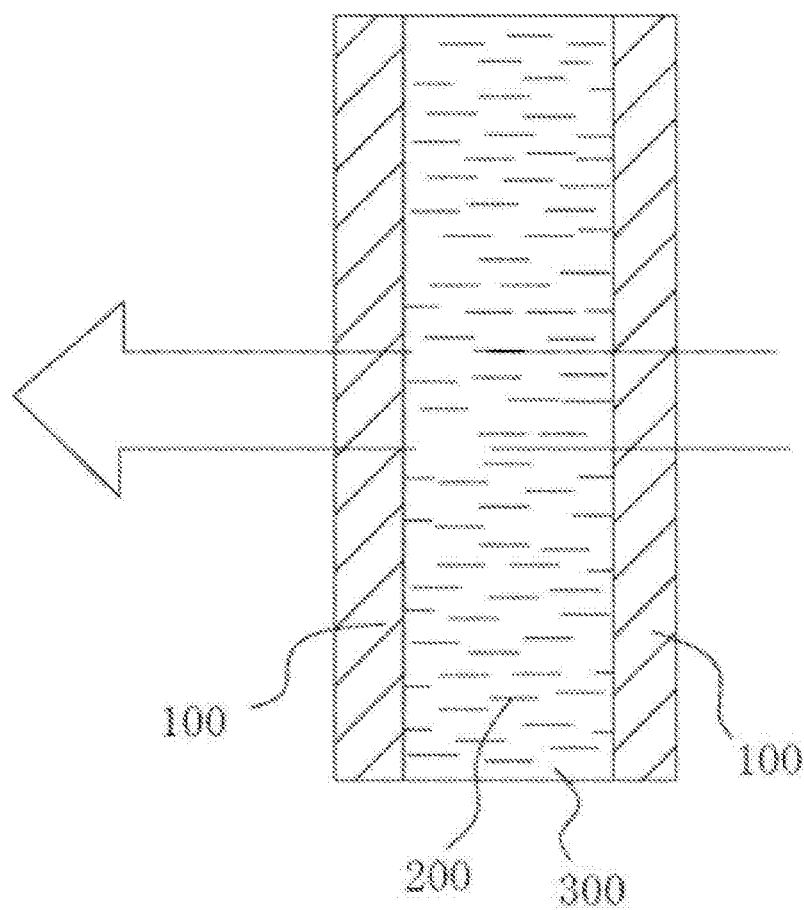

In the light valve made of the core-shell nanorod of the present invention, when no electric field is applied (OFF state), the core-shell nanorod 200 in the liquid suspension medium 300 is randomly dispersed due to Brownian motion, at this time, the light beam entering the light valve is absorbed and/or scattered, so that the light valve has poor light transmittance and is relatively dark, of which structure is as shown in FIG. 1. When an electric field is applied (ON state), the core-shell nanorod 200 is polarized by the electric field and therefore oriented in a direction parallel to each other in the electric field, so that most of the light can pass through the light valve, so that the light valve has effectively enhanced light transmittance and is relatively transparent, of which structure is as shown in FIG. 2.

Figure 3:
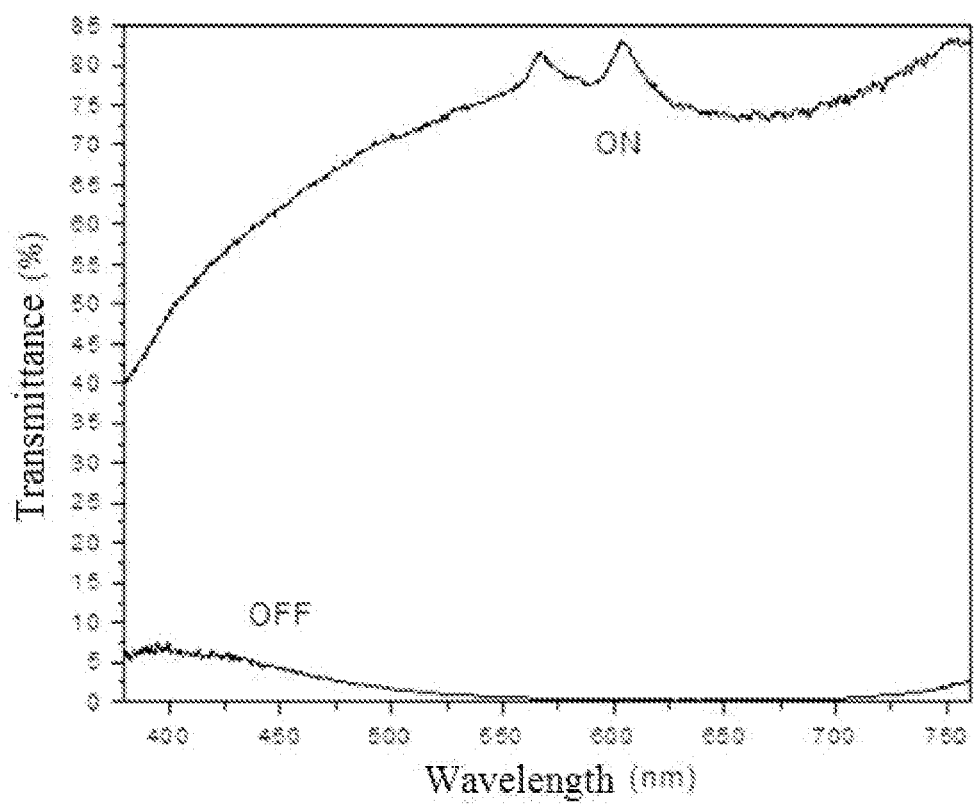
FIG. 3 is an absorption spectrum of the light valve of the present invention under OFF state and ON state.

FIG. 3 is an absorption spectrum curve of the light valve of the present invention before and after applying a voltage of 110 V.

The present invention is further explained through Examples below.

[Example 1] Preparation of Core-Shell Nanorod

The mass ratio of each component titanium dioxide $TiO_2$:component B:component C:component D:component E:lower alcohol:water:isoamyl acetate is 1.0:1.5:1.0:1.0:1.6:1.5:0.2:23.4.

To a 250 mL three-neck round bottom glass flask, 30 g of isoamyl acetate solution containing 21.2 wt % nitrocellulose (¼ sec SS), 6 g of $I_2$, 70 g of isoamyl acetate, 4 g of anhydrous $CaI_2$ and 4 g of Aeroxide® P25 were added and heated to 42° C. After $I_2$ was dissolved, 6 g of anhydrous methanol, 0.8 g of distilled water and 4 g of 2,5-PDA.2H$_2$O (2,5-pyrazine diformic acid dihydrate) were added to the three-neck round bottom glass flask. The resultant was heated and stirred at 42° C. to react for 4 h and then cooled naturally.

The reaction solution was centrifuged at 1350 G for 0.5 h to remove the large-particle products, and the supernatant was centrifuged at 18000 G for 5 h. The supernatant was discarded to give light controlled particles, that is, to obtain core-shell nanorod (i.e., the inorganic-organic hybrid core-shell $TiO_2$ nanorod). The inorganic-organic hybrid core-shell $TiO_2$ nanorod was sufficiently dispersed with 250 mL of isoamyl acetate. The mixed liquid was referred to as LCP-Example-1.

SEM results showed that the inorganic-organic hybrid core-shell nanorod of LCP-Example-1 has a particle length of 300 nm, a particle width of 50 nm and a particle aspect ratio of 6.

[Example 2] Preparation of Core-Shell Nanorod

A mixed liquid sample (referred to as LCP-Example-2) was prepared according to the method of [Example 1], except that n-propanol was used instead of anhydrous methanol, $TiO_2$ with a particle size of 80 nm was used instead of Aeroxide® P25, the resultant was heated and stirred at 60° C. to react for 10 h, and the mass ratio of the components component A:component B:component C:component D:component E:lower alcohol:water:isoamyl acetate is 0.1:2.5:1.0:3.0:3.5:0.5:1.0:80.

SEM results showed that the inorganic-organic hybrid core-shell nanorod of LCP-Example-2 has a particle length of 350 nm, a particle width of 40 nm and a particle aspect ratio of 8.8.

[Example 3] Preparation of Core-Shell Nanorod

A mixed liquid sample (referred to as LCP-Example-3) was prepared according to the method of [Example 2], except that 2-pyrazine formic acid was used instead of 2,5-pyrazine diformic acid dihydrate, the resultant was heated and stirred at 5° C. to react for 20 h, and the mass ratio of the components component A:component B:component C:component D:component E:lower alcohol:water:isoamyl acetate is 0.2:3.5:1.0:3.0:3.0:0.5:0.2:50.

SEM results showed that the inorganic-organic hybrid core-shell nanorod of LCP-Example-3 has a particle length of 150 nm, a particle width of 30 nm and a particle aspect ratio of 5.

[Example 4] Preparation of Core-Shell Nanorod

A mixed liquid sample (referred to as LCP-Example-4) was prepared according to the method of [Example 1], except that n-propanol was used instead of anhydrous methanol, ethyl cellulose was used instead of nitrocellulose, the resultant was heated and stirred at 100° C. to react for 0.2 h, and the mass ratio of the components component A:component B:component C:component D:component E:lower alcohol:water:isoamyl acetate is 0.5:4.0:1.0:2.5:3.5:1.5:0.8:65.

SEM results showed that the inorganic-organic hybrid core-shell nanorod of LCP-Example-4 has a particle length of 600 nm, a particle width of 50 nm and a particle aspect ratio of 12.

[Example 5] Preparation of Core-Shell Nanorod

A mixed liquid sample (referred to as LCP-Example-5) was prepared according to the method of [Example 1], except that KI was used instead of anhydrous $CaI_2$, ethyl cellulose was used instead of nitrocellulose, the resultant was heated and stirred at 70° C. to react for 2 h, and the mass ratio of the components component A:component B:component C:component D:component E:lower alcohol:water:isoamyl acetate is 0.2:3.5:1.0:2.0:1.5:2.5:0.5:100.

SEM results showed that the inorganic-organic hybrid core-shell nanorod of LCP-Example-5 has a particle length of 800 nm, a particle width of 30 nm and a particle aspect ratio of 26.6.

[Example 6] Preparation of Core-Shell Nanorod

A mixed liquid sample (referred to as LCP-Example-6) was prepared according to the method of [Example 1], except that n-hexanol was used instead of anhydrous methanol, $TiO_2$ with a particle size of 80 nm was used instead of Aeroxide® P25, cellulose acetate was used instead of nitrocellulose, the resultant was heated and stirred at 35° C. to react for 1 h, and the mass ratio of the components component A:component B:component C:component D:component E:lower alcohol:water:isoamyl acetate is 0.3:2.0:1.0:3.2:3.0:0.5:1.0:80.

SEM results showed that the inorganic-organic hybrid core-shell nanorod of LCP-Example-6 has a particle length of 250 nm, a particle width of 40 nm and a particle aspect ratio of 6.3.

[Example 7] Preparation of LV Suspension 40 g of TDTM (tridecyl trimellitate) was added into a 250 ml round bottom glass flask, and the LCP-Example-1 prepared in [Example 1] was added in batches. Isoamyl acetate was removed by a rotary evaporator, and the resultant was further treated using a rotary evaporator at 80° C. for 3 h to obtain a LV suspension (referred to as LV-Example-7) containing the inorganic-organic hybrid core-shell $TiO_2$ nanorod.

[Example 8] Preparation of LV Suspension

LV-Example-8 was prepared according to the method of [Example 7], except that the sample LCP-Example-2 of [Example 2] was used instead of the sample LCP-Example-1 of [Example 1], and dioctyl phthalate was used instead of TDTM (tridecyl trimellitate).

[Example 9] Preparation of LV Suspension

LV-Example-9 was prepared according to the method of [Example 7], except that the sample LCP-Example-3 of [Example 3] was used instead of the sample LCP-Example-1 of [Example 1], and silicone oil was used instead of TDTM (tridecyl trimellitate).

[Example 10] Preparation of LV Suspension

LV-Example-10 was prepared according to the method of [Example 7], except that the sample LCP-Example-4 of [Example 4] was used instead of the sample LCP-Example-1 of [Example 1], and transformer oil was used instead of TDTM (tridecyl trimellitate).

[Example 11] Preparation of LV Suspension

LV-Example-11 was prepared according to the method of [Example 7], except that the sample LCP-Example-5 of [Example 5] was used instead of the sample LCP-Example-1 of [Example 1], and diisooctyl phthalate was used instead of TDTM (tridecyl trimellitate).

[Example 12] Preparation of LV Suspension

LV-Example-12 was prepared according to the method of [Example 7], except that the sample LCP-Example-6 of [Example 6] was used instead of the sample LCP-Example-1 of [Example 1], and dodecylbenzene was used instead of TDTM (tridecyl trimellitate).

[Example 13] Manufacture of LV-1 Light Valve from LV-Example-7

The LV-Example-7 prepared in [Example 7] was sealed between two transparent ITO conductive glass electrodes using an epoxy resin to form a LV light valve (referred to as LV-1) with a thickness of 200 μm. When no voltage is applied (OFF state), LV-1 shows blue tune and the full light transmittance is 1.0%. When an alternating current of 50 Hz and 110 V is applied (ON state), LV-1 becomes clear and the full light transmittance is 68.1%.

In addition, the reversibility and stability of LV-1 were evaluated by periodic changing between OFF state and ON state and maintaining each state for 2 minutes to establish an ON-OFF cycle. After 5000 ON-OFF cycles, the contrast of LV-1 remains 105, corresponding to a reversibility of 95.5%. The specific results are shown in Table 2.

[Example 14] Manufacture of LV-2 Light Valve from LV-Example-8

LV-2 was manufactured and tested according to [Example 13], except that LV-Example-8 was used instead of LV-Example-7. The specific results are shown in Table 2.

[Example 15] Manufacture of LV-3 Light Valve from LV-Example-9

LV-3 was manufactured and tested according to [Example 13], except that LV-Example-9 was used instead of LV-Example-7. The specific results are shown in Table 2.

[Example 16] Manufacture of LV-4 Light Valve from LV-Example-10

LV-4 was manufactured and tested according to [Example 13], except that LV-Example-10 was used instead of LV-Example-7. The specific results are shown in Table 2.

[Example 17] Manufacture of LV-5 Light Valve from LV-Example-11

LV-5 was manufactured and tested according to [Example 13], except that LV-Example-11 was used instead of LV-Example-7. The specific results are shown in Table 2.

[Example 18] Manufacture of LV-6 Light Valve from LV-Example-12

LV-6 was manufactured and tested according to [Example 13], except that LV-Example-12 was used instead of LV-Example-7. The specific results are shown in Table 2.

[Comparative Example 1] Preparation of an Inorganic-Organic Complex

A comparative LCP sample (referred to as LCP-Comparative Example-1) was prepared according to the method of [Example 1], except that no was added.

SEM results showed that the inorganic-organic complex of LCP-Comparative Example-1 has a particle length of 400 nm, a particle width of 50 nm and a particle aspect ratio of 8.

[Comparative Example 2] Preparation of TiO$_2$ Nanorod

TiO$_2$ nanorod was synthesized by a two-step method. The first step is to synthesize sodium titanate nanotube. 4 g and 80 ml of 10 mol/L NaOH aqueous solution was put into a 100 ml PTFE-lined stainless steel autoclave, which was then sealed. The autoclave was put into an oven, heated at 140° C. for 24 h, and cooled naturally in air to produce white sodium titanate nanotube precipitate. After centrifuging at 18000 G for 5 h, the supernatant was discarded to obtain sodium titanate nanotube. The resultant was then washed with deionized water to adjust the pH of the solution to 7 or so. The second step is to synthesize TiO$_2$ nanorod. 2 g of sodium titanate nanotube, 76 ml of deionized water and 2 ml of 30% H$_2$O$_2$ solution were put into a 100 ml PTFE-lined stainless steel autoclave, which was then sealed. The autoclave was then put into an oven, heated at 180° C. for 24 h, and cooled naturally in air to produce white TiO$_2$ nanorod precipitate. After centrifuging at 18000 G for 5 h, the supernatant was discarded to obtain TiO$_2$ nanorod. The TiO$_2$ nanorod was sufficiently dispersed with 250 mL of isoamyl acetate. The mixed liquid was referred to as LCP-Comparative Example-2.

SEM results showed the TiO$_2$ nanorod of LCP-Comparative Example-2 has a particle length of 250 nm, a particle width of 50 nm and a particle aspect ratio of 5.

[Comparative Example 3] Preparation of LV Suspension

LV-Comparative Example-3 was prepared according to the method of [Example 7], except that the sample LCP-Comparative Example-1 of [Comparative Example 1] was used instead of the sample LCP-Example-1 of [Example 1].

[Comparative Example 4] Preparation of LV Suspension

LV-Comparative Example-4 was prepared according to the method of [Example 7], except that the sample LCP-Comparative Example-2 of [Comparative Example 2] was used instead of the sample LCP-Example-1 of [Example 1].

[Comparative Example 5] Manufacture of LV-7 Light Valve from LV-Comparative Example-3

LV-7 was manufactured and tested according to [Example 13], except that LV-Comparative Example-3 was used instead of LV-Example-7. The measured value of the light transmittance of LV-7 were 1.0% (OFF state) and 50.2% (ON state), respectively. Further, after 5000 ON-OFF cycles, the contrast of LV-7 became 45, corresponding to a reversibility of 90%. The specific results are shown in Table 2.

[Comparative Example 6] Manufacture of LV-8 Light Valve from LV-Comparative Example-4

LV-8 was manufactured and tested according to [Example 13], except that LV-Comparative Example-4 was used instead of LV-Example-7. The specific results are shown in Table 2.

Comparisons between LV-1 and LV-7, and between LV-1 and LV-8 confirm that the core-shell nanorod greatly improves the light control performance of the light valve.

TABLE 2

| Examples | Light Valve No. | Full light transmittance (%) OFF state | Full light transmittance (%) ON state (110 V) | Reversibility (%) after 5000 ON-OFF cycles |
|---|---|---|---|---|
| Example 13 | LV-1 | 1.0 | 68.1 | 95 |
| Example 14 | LV-2 | 0.4 | 58.3 | 96 |
| Example 15 | LV-3 | 2.0 | 68.5 | 95 |
| Example 16 | LV-4 | 1.3 | 68.2 | 95 |
| Example 17 | LV-5 | 0.8 | 67.3 | 96 |
| Example 18 | LV-6 | 2.1 | 69.1 | 96 |
| Comparative Example 5 | LV-7 | 1.0 | 50.2 | 90 |
| Comparative Example 6 | LV-8 | 1.0 | 33.6 | 87 |

It is shown by experiments that the full light transmittance of the light valve of the present invention reaches about 68.1%, which is far higher than the light transmittance of Comparative Example 5 without titanium dioxide and the light transmittance of Comparative Example 6 without inorganic-organic complex. Such technical effect is surprisingly. Therefore, the present invention effectively overcomes the disadvantage of a small adjustable range of light transmittance of light valve in the prior art, achieves better technical effects, can adjust the light transmittance in a wider range, and has excellent application prospects.

The above Examples are for illustration only, and are not to limit the scope of the present invention. All chemicals used in Examples are purchased from Sigma Aldrich Company, unless otherwise stated. In all Examples, all parts and percentages are by weight, unless otherwise stated. The light transmittance of LV light valve is measured by Oceanview spectrometer.

The invention claimed is:

1. A light valve capable of controlling light transmittance, comprising two transparent electrodes and a liquid suspension medium sandwiched between the electrodes, wherein an inorganic-organic hybrid core-shell nanorod is uniformly dispersed in the liquid suspension medium, the nanorod having a balanced buoyancy and gravity in the liquid suspension medium to allow the nanorod to suspend stably in the liquid suspension medium and to move freely; and the two transparent electrodes are connected with an alternating current with an adjustable voltage,
    wherein the nanorod comprises a nanorod inner core composed of a metal oxide and a nanorod outer shell composed of an inorganic-organic complex containing carbon and nitrogen atoms, wherein the metal oxide composing the nanorod inner core is titanium dioxide TiO$_2$,
    wherein the nanorod outer shell comprises four components B, C, D and E, wherein the component B is iodine, the component C is an alkali metal halide or an alkaline earth metal halide, the component D is a nitrogen-containing heterocyclic carboxylic acid or a nitrogen-containing heterocyclic carboxylic acid ester, and the component E is a modified cellulose, and a mass ratio of the components B:C:D:E is (0.2-5):1:(0.4-3):(0.5-5), wherein
    the core-shell nanorod has a particle length of 200-500 nm and an aspect ratio of particle length to particle width of 5-15;
    the titanium dioxide TiO$_2$ has a particle size of 10-100 nm;

the nitrogen-containing heterocyclic carboxylic acid or the nitrogen-containing heterocyclic carboxylic acid ester is one or more of the following compounds:

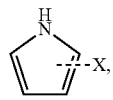

X = (COOH)n or (COOR)n with n being 1 to 4;

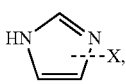

X = (COOH)n or (COOR)n with n being 1 to 3;

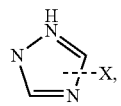

X = (COOH)n or (COOR)n with n being 1 to 2;

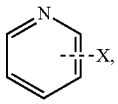

X = (COOH)n or (COOR)n with n being 1 to 5;

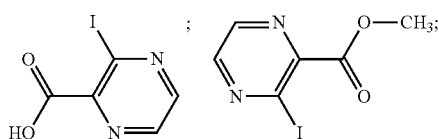

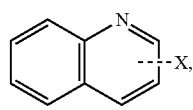

X = (COOH)n or (COOR)n with n being 1 to 7;

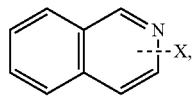

X = (COOH)n or (COOR)n with n being 1 to 7;

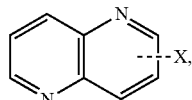

X = (COOH)n or (COOR)n with n being 1 to 6;

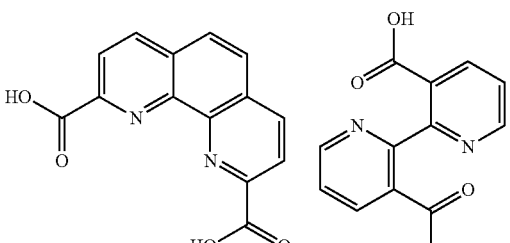

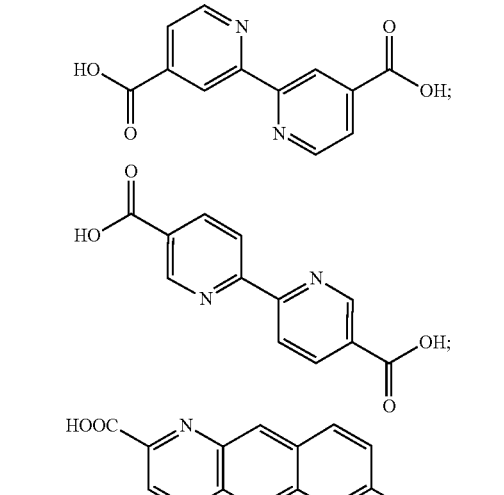

2. The light valve capable of controlling the light transmittance according to claim 1, wherein the liquid suspension medium is a non-conductive liquid, which is at least one of mineral insulating oil, synthetic insulating oil and vegetable oil.

3. The light valve capable of controlling the light transmittance according to claim 2, wherein the mineral insulating oil is transformer oil.

4. The light valve capable of controlling the light transmittance according to claim 2, wherein the synthetic insulating oil is at least one of silicone oil, a fluorocarbon organic compound, dioctyl phthalate, dibutyl phthalate, diisooctyl phthalate, triisodecyl trimellitate (TDTM), dodecylbenzene and polybutylene oil.

5. The light valve capable of controlling the light transmittance according to claim 2, wherein the vegetable oil is at least one of castor oil, soybean oil and rapeseed oil.

6. The light valve capable of controlling the light transmittance according to claim 1, wherein the transparent electrode is ITO conductive glass or ITO/PET conductive film or nano-Ag wire/PET conductive film or nano-Cu wire/PET conductive film.

7. The light valve capable of controlling the light transmittance according to claim 1, wherein the two transparent electrodes sandwiching the liquid suspension medium are sealed around with an insulating material which is an epoxy resin.

8. The light valve capable of controlling the light transmittance according to claim 1, wherein the alternating current is an alternating current of 5-500 V.

9. The light valve capable of controlling the light transmittance according to claim 1, wherein the titanium dioxide $TiO_2$ is one or more of rutile $TiO_2$, brookite $TiO_2$, titanium dioxide (B) and anatase $TiO_2$.

10. The light valve capable of controlling the light transmittance according to claim 1, wherein a purity of the iodine is not less than 98%.

11. The light valve capable of controlling the light transmittance according to claim 1, wherein the alkaline earth metal halide is one or more of calcium iodide, barium iodide, calcium bromide and barium bromide.

12. The light valve capable of controlling the light transmittance according to claim 1, wherein a purity of the alkali metal halide or the alkaline earth metal halide is not less than 99%.

13. The light valve capable of controlling the light transmittance according to claim 1, wherein the modified cellulose is at least one of nitrocellulose, ethyl cellulose, cellulose acetate and cellulose butyrate.

* * * * *